USO09594714B2

(12) United States Patent
Chang

(10) Patent No.: US 9,594,714 B2
(45) Date of Patent: Mar. 14, 2017

(54) MULTI-CHANNEL STORAGE SYSTEM SUPPORTING A MULTI-COMMAND PROTOCOL

(71) Applicant: EMPIRE TECHNOLOGY DEVELOPMENT LLC, Wilmington, DE (US)

(72) Inventor: Hui Huang Chang, Singapore (SG)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 527 days.

(21) Appl. No.: 14/001,174

(22) PCT Filed: Nov. 15, 2012

(86) PCT No.: PCT/US2012/065373
§ 371 (c)(1),
(2) Date: Aug. 23, 2013

(87) PCT Pub. No.: WO2014/077821
PCT Pub. Date: May 22, 2014

(65) Prior Publication Data
US 2014/0136751 A1    May 15, 2014

(51) Int. Cl.
*G06F 13/40* (2006.01)
*G06F 13/16* (2006.01)

(52) U.S. Cl.
CPC ...... *G06F 13/4022* (2013.01); *G06F 13/1657* (2013.01)

(58) Field of Classification Search
None
See application file for complete search history.

(56) References Cited

U.S. PATENT DOCUMENTS 5,249,180 A * 9/1993 Sennema ............. H04L 49/101
340/2.28
5,345,228 A    9/1994 Franaszek et al.
(Continued)

OTHER PUBLICATIONS

John C. Hoffman et al., "A High-Speed Dynamic Partial Reconfiguration Controller Using Direct Memory Access Through a Multiport Memory Controller and Overclocking with Active Feedback", International Journal of Reconfigurable Computing, 2011, pp. 1-10, vol. 2011, Hindawi Publishing Corporation.
(Continued)

*Primary Examiner* — Ilwoo Park
(74) *Attorney, Agent, or Firm* — Ren-Sheng International

(57) ABSTRACT

Techniques are generally described related to a multi-channel storage system. One example multi-channel storage system may include a plurality of memory-controllers, each memory-controller configured to control one or more storage units. The multi-channel storage system may further include a multi-channel interface having a plurality of input-output (IO) channels; and a channel-controller switch configured to support data communications between any one of the plurality of IO channels and any one of the plurality of memory-controllers. Upon receiving a request instructing using at least two of the plurality of IO channels and at least two of the plurality of memory-controllers, the multi-channel interface of the multi-channel storage system is configured to utilize the channel-controller switch to concurrently transfer data via the at least two of the plurality of IO channels or the at least two of the plurality of memory-controllers.

16 Claims, 8 Drawing Sheets

(56) References Cited

U.S. PATENT DOCUMENTS

| | | | |
|---|---|---|---|
| 5,805,610 | A | 9/1998 | Illes et al. |
| 5,875,470 | A * | 2/1999 | Dreibelbis ............ G11C 7/1075 711/105 |
| 6,289,376 | B1 | 9/2001 | Taylor et al. |
| 6,438,368 | B1 * | 8/2002 | Phillips ................. G06F 3/0617 348/E5.008 |
| 6,621,818 | B1 * | 9/2003 | Szczepanek ............ H04L 12/42 370/389 |
| 6,799,252 | B1 * | 9/2004 | Bauman .............. G06F 12/0813 710/316 |
| 7,349,480 | B2 | 3/2008 | Tsatsanis et al. |
| 7,404,021 | B2 * | 7/2008 | Wilkins ................ G06F 3/0613 710/1 |
| 7,421,520 | B2 | 9/2008 | Wilkins et al. |
| 2002/0085497 | A1 * | 7/2002 | Phillips ............... H04L 12/5601 370/235.1 |
| 2003/0195918 | A1 | 10/2003 | Horn et al. |
| 2008/0239937 | A1 | 10/2008 | Erickson et al. |
| 2009/0172261 | A1 | 7/2009 | Prins et al. |
| 2010/0272117 | A1 * | 10/2010 | Wu ....................... H04L 49/101 370/413 |
| 2011/0153878 | A1 | 6/2011 | Chun et al. |
| 2011/0161554 | A1 | 6/2011 | Selinger et al. |
| 2013/0236168 | A1 * | 9/2013 | Matsui .................. H04B 10/03 398/2 |

OTHER PUBLICATIONS

Notification of Transmittal of the International Search Report and the Written Opinion of the International Searching Authority, PCT/US12/65373, Feb. 28, 2013.

"Universal Serial Bus Mass Storage Class Specification Overview", Sep. 5, 2008, USB Implementers Forum.

"Parallel ATA", Wikipedia, Last Modified on Apr. 22, 2013, <retrieved on May 3, 2013>, Retrieved from the Internet at <URL: http://en.wikipedia.org/wiki/Parallel_ATA>.

"Serial ATA", Wikipedia, Last Modified on May 5, 2013, <Retrieved on May 8, 2013>, Retrieved from the Internet at <URL: http://en.wikipedia.org/wiki/S-ATA>.

"SCSI", Wikipedia, Last Modified on May 3, 2013, <Retrieved on May 8, 2013>, Retrieved from the Internet at <URL: http://en.wikipedia.org/wiki/SCSI>.

"About USB Implementers Forum, Inc.", Universal Serial Bus about USB-IF, Jun. 1, 2005, <Retrieved on May 8, 2013>, Retrieved from the Internet at <URL: http://www.usb.org/about. Retrieved Nov. 4, 2009>.

"100G Ethernet Cheat Sheet", Network World, Nov. 19, 2009, <Retrieved on May 8, 2013>, Retrieved from the Internet at <URL: http://www.networkworld.com/news/2009/111909-100g-ethernet-cheatsheet.html>.

"IEEE P802.3ba 40Gb/s and 100Gb/s Ethernet Task Force", Last Update: Jun. 19, 2010, <Retrieved on May 8, 2013>, Retrieved from the Internet at <URL: http://www.ieee802.org/3/ba/>.

* cited by examiner (700) A computer program product (702) Signal bearing medium (704) at least one of one or more instructions for receiving, by the multi-channel storage system, a first request having a read command seeking a first set of data, wherein the read command contains a first set of identifiers and a second set of identifiers, the first set of identifiers are associated with a first plurality of input-output (IO) channels of the multi-channel storage system, and the second set of identifiers are associated with a first plurality of memory-controllers of the multi-channel storage system;

concurrently retrieving, by the first plurality of memory-controllers, the first set of data from one or more storage units;

routing, by a channel-controller switch of the multi-channel storage system, the first set of data from the first plurality of memory-controllers to the first plurality of IO channels; and concurrently transmitting, by the first plurality of IO channels, the first set of data.

(706) A computer readable medium (708) A recordable medium (710) A communications medium

Fig. 7

MULTI-CHANNEL STORAGE SYSTEM SUPPORTING A MULTI-COMMAND PROTOCOL

CROSS-REFERENCE TO RELATED APPLICATION

The present application is a U.S. National Stage filing under 35 U.S.C. §371 of International Application PCT/US2012/065373, filed on Nov. 15, 2012 and entitled "A MULTI-CHANNEL STORAGE SYSTEM SUPPORTING A MULTI-COMMAND PROTOCOL." The International Application, including any appendices or attachments thereof, is incorporated by reference herein in its entirety.

BACKGROUND

The performance of a data-centric application may be highly dependent on the latency or throughput of a data storage system. A conventional approach to increase the throughput of the data storage system is to use multiple storage devices so that a request for data may be served by these multiple storage devices simultaneously.

Solid state devices may provide good random access speed and may also have low energy consumption. However, data throughput of solid state devices may be limited by the existing device interfaces, such as USB 2.0 and SATA. Although multiple solid state devices may be implemented in a storage architecture that is similar to a RAID configuration, existing device interfaces may nevertheless prevent the data throughputs available in the solid state devices from being fully utilized.

SUMMARY

In accordance with some embodiments of the present disclosure, a multi-channel storage system may include a plurality of memory-controllers. Each memory-controller is configured to control one or more storage units. The multi-channel storage system may further include a multi-channel interface having a plurality of input-output (IO) channels, and a channel-controller switch configured to support data communications between any one of the plurality of IO channels and any one of the plurality of memory-controllers. Upon receiving a request instructing using at least two of the plurality of IO channels and at least two of the plurality of memory-controllers, the multi-channel interface is configured to utilize the channel-controller switch to concurrently transfer data via the at least two of the plurality of IO channels or the at least two of the plurality of memory-controllers.

In accordance with other embodiments of the present disclosure, a method for accessing a multi-channel storage system may receive, by the multi-channel storage system, a first request having a read command seeking a first set of data. The read command may contain a first set of identifiers and a second set of identifiers, the first set of identifiers being associated with a first plurality of input-output (IO) channels of the multi-channel storage system, and the second set of identifiers being associated with a first plurality of memory-controllers of the multi-channel storage system. The method may concurrently retrieve, by the first plurality of memory-controllers, the first set of data from one or more storage units coupled with the first plurality of memory-controllers, and route, by a channel-controller switch of the multi-channel storage system, the first set of data from the first plurality of memory-controllers to the first plurality of IO channels. The method may further concurrently transmit, by the first plurality of IO channels, the first set of data.

In accordance with further embodiments of the present disclosure, another method for accessing a multi-channel storage system may prepare, by a computer system, a first request containing a read command seeking a first set of data. The read command includes a first set of identifiers, each identifier referring to one of a first plurality of input-output (IO) channels in the multi-channel storage system, and a second set of identifiers, each identifier referring to one of a first plurality of memory-controllers in the multi-channel storage system. The method may transmit, by the computer system, the first request to the multi-channel storage system. The multi-channel storage system may be configured to extract the read command from the first request, instruct the first plurality of memory-controllers to concurrently retrieve the first set of data from one or more storage units, and instruct the first plurality of IO channels to concurrently transfer the first set of data to the computer system.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 7 shows an illustrative embodiment of an example computer program product.

DETAILED DESCRIPTION

Figure 1:
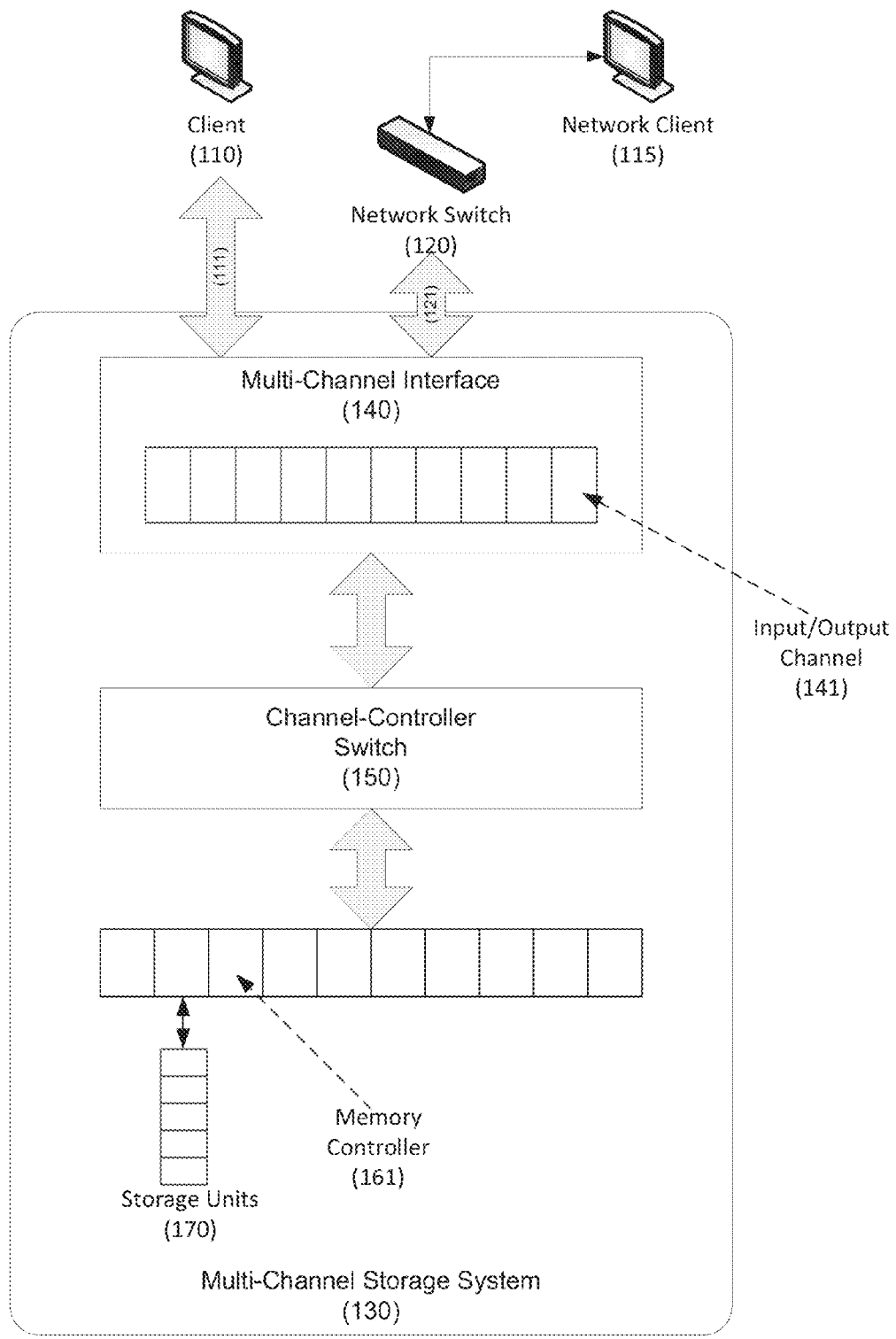
FIG. 1 shows a block diagram illustrating embodiments of a multi-channel storage system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

This disclosure is drawn, inter alia, to methods, apparatuses, computer programs, and systems related to a multi-channel storage system and a multi-command storage protocol.

FIG. 1 shows a block diagram illustrating embodiments of a multi-channel storage system. In FIG. 1, a multi-channel storage system 130 may be a storage server for storing and retrieving data on behalf of one or more clients 110 and/or one or more network clients 115. A client 110 may be directly coupled with the multi-channel storage system 130 via one or more physical links. A network client 115 may be indirectly coupled with the multi-channel storage system 130 through a network switch 120. The client 110, the network client 115, and/or the multi-channel storage system 130 may be implemented using a personal computer (PC), workstation, laptop, tablet PC, handheld computing/communication device, cell phone, smart phone, or a similar device. The multi-channel storage system 130 may be configured to process data requests 111 and/or data requests 121 from the client 110 and/or the network client 115 respectively. The data requests 111 and the data requests 121 may be file-level requests, block-level requests, or both.

In some embodiments, the multi-channel storage system 130 may be configured to contain, among other components, a multi-channel interface 140, a channel-controller switch 150, and multiple memory-controllers 161. The multi-channel interface 140 may contain one or more input/output (IO) channels 141. Each memory-controller 161 may be configured to control one or more storage units 170. In one embodiment, each storage unit 170 may be implemented using one or more solid state storage devices. The channel-controller switch 150 may be configured to facilitate data transmissions between each one of the IO channels 141 and each one of the memory-controller 161, thereby allowing storage data to be transmitted between the multi-channel interface 140 and the one or more storage units 170.

In some embodiments, each IO channel 141 in the multi-channel interface 140 may support one or more communication standards such as, without limitation, Parallel ATA, Serial ATA, SCSI, USB, and IEEE 1394/i-Link. Thus, a client 110 may utilize one or more links that are compatible with one or more of the above communication standards to connect to one or more IO channels 141. Further, each IO channel 141 in the multi-channel interface 140 may support network communication standards such as, without limitation, Ethernet, Gigabit Ethernet, and Optical Fiber Communication. A single network client 115 may be able to utilize one or more IO channels 141 via the network switch 120.

In some embodiments, the IO channels 141 in the multi-channel interface 140 may be divided into multiple sub-groups, each containing one or more IO channels 141. For example, the client 110 may be connected with one sub-group of the IO channels 141, and the network client 115 may be connected with another sub-group of the IO channels 141. In other words, each IO channel 141 in a sub-group may be dedicated to serve either the client 110 or the network client 115 it is connected with. Thus, the client 110 may take full advantage of the throughputs provided by the sub-group of the IO channels 141 it is connected with, without having to share the throughputs with other clients 110.

In some embodiments, multiple clients 110 or network clients 115 may be concurrently connected with multiple IO channels 141 utilizing multiple-input/multiple output (MIMO) technology. The MIMO modulation and demodulation technologies may allow a transmitter to concurrently communicate with multiple receivers, and a receiver to concurrently serve multiple transmitters. In this case, each of the multiple clients 110 or the network clients 115 may be deemed a transmitter, and each of the IO channels 141 may be deemed a receiver. Thus, a single IO channel 141 may serve multiple clients 110 or network clients 115 at the same time, thereby increase the throughputs and versatility of the multi-channel interface 140. Alternatively, the multiple IO channels 141 may be standard interfaces that work together in order to serve the clients 110 and 115.

In some embodiments, the multi-channel storage system 130 may receive from the client 110 or the network client 115 one or more requests 111 and 121 for storing data to, or retrieving data from, the storage units 170. Each of the requests 111 and 121 may contain one or more commands instructing the multi-channel storage system 130 to utilize N number of IO channels 141 to access M number of memory-controllers 161 that are associated with the storage units 170. N may be a number between 1 and the total number of IO channels 141 in the multi-channel interface 140, and M may be a number between 1 and the total number of memory-controllers 161. The channel-controller switch 150 may be configured to provide routing and switching of the data transmission among the N IO channels 141 and M memory-controllers 161. Details of the requests 111 and 121, the commands, as well as the channel-controller switch 150 are further described below.

In some embodiments, each memory-controller 161 may be responsible for retrieving data from, or storing data to, its associated set of storage units 170. The storage units 170 may be implemented using conventional non-volatile storage drives or non-volatile solid-state storage devices. The solid state storage devices may include flash-based storage devices, RAM-based storage devices, or others. The flash-based storage devices may also be referred to as flash memory or flash memory chips. Storages provided by the flash-based solid-state storage device may be organized into one or more flash pages. Multiple flash pages may form a flash-block. Read and write operations performed on the flash-based storage device may be page-based. When the storage units 170 are implemented using a flash-based storage device, a read or write operation initiated by the memory-controller 161 may affect at least one flash page in the storage units 170. In comparison, an erase operation instructed by the memory-controller 161 may be flash-block based. That is, each erase operation may set a flash-block of data to default values. Thus, read throughput of the flash-based storage units 170 may be faster than the write or erase throughputs.

In some embodiments, the multi-channel storage system 130 may increase storage data throughputs by allowing concurrent access to multiple storage units 170 through the multiple memory-controllers 161. Further, the multi-channel interface 140, along with the channel-controller switch 150, may allow multiple clients 110 and 115 to concurrently access any and all of the multiple storage units 170, even when the storage units 170 are implemented using conventional flash devices with limited throughput, and the memory-controllers 161 are implemented using conventional flash memory controllers.

Figure 2:
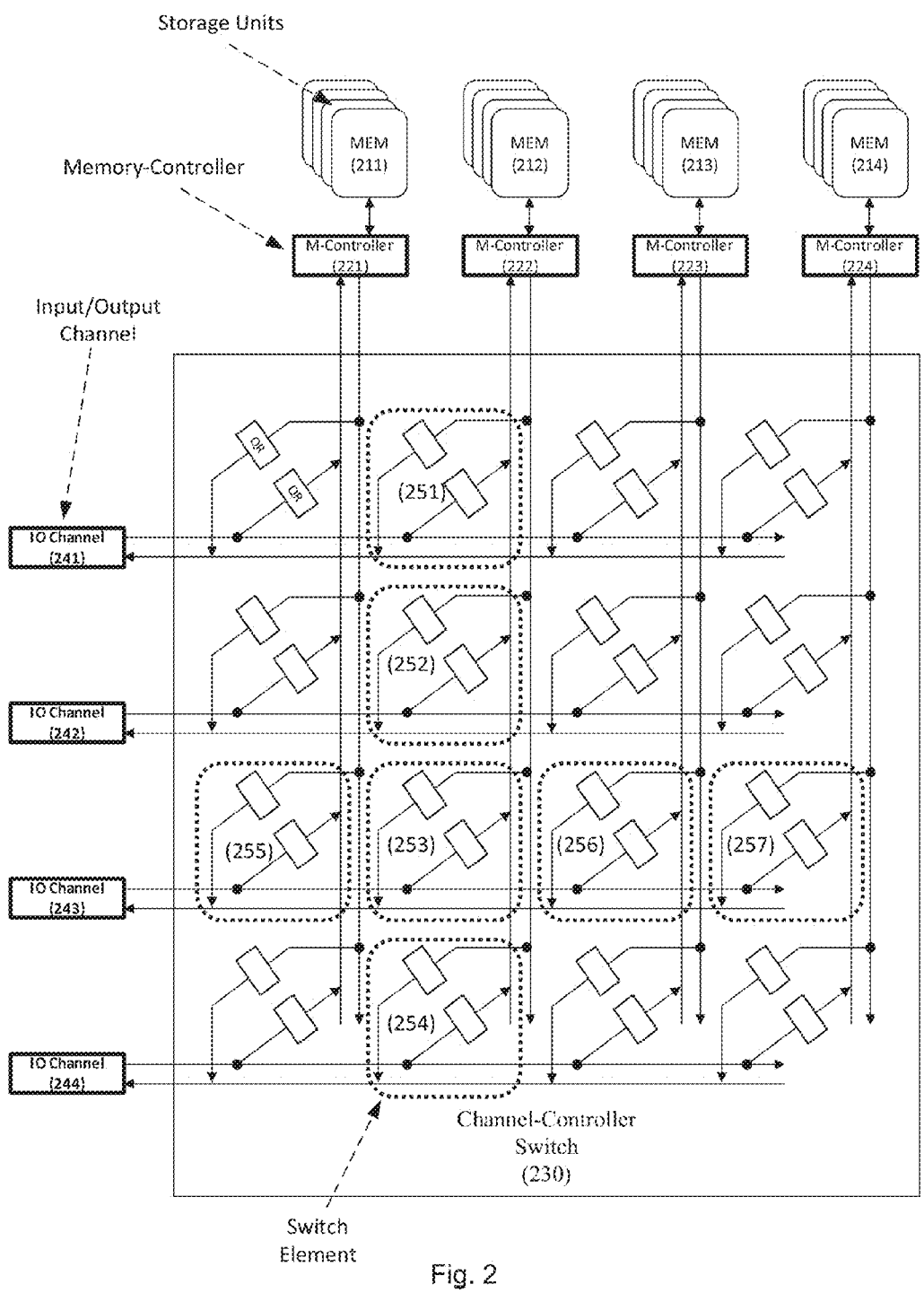
FIG. 2 shows illustrative embodiments of a channel-controller switch configured to connect M number of memory-controllers and N number of IO channels.

FIG. 2 shows illustrative embodiments of a channel-controller switch configured to connect M number of memory-controllers and N number of IO channels. The IO channels 241, 242, 243, and 244 are similar to the IO channels 141 of FIG. 1. The channel-controller switch 230 is similar to the channel-controller switch 150 of FIG. 1. The memory-controllers 221, 222, 223, and 224 are similar to the memory controllers 161 of FIG. 1. The storage units 211, 212, 213, and 214 are similar to the storage units 170 of FIG. 1.

Referring back to FIG. 2, the channel-controller switch 230 contains a matrix of switch elements, including switch elements 251, 252, 253, 254, 255, 256, and 257. The number of switch elements in the matrix is equal to M×N, while M equals a number of memory-controllers, and N equals a number of IO channels. Note that M may or may not be equal to N. Further, each switch element in the matrix may connect a specific IO channel with a specific memory-controller. For example, in FIG. 2, a switch element 252 may connect IO channel 242 with memory-controller 222, and a switch element 256 may connect IO channel 243 with memory-controller 223.

In some embodiments, each IO channel may be configured to parallel-transmit data to all of the memory-controllers via a corresponding set of switch elements. Parallel-transmitting may refer to the transmitting of data concurrently or simultaneously. For example, the IO channel 243 may be configured to concurrently transmit a piece of data to the memory-controllers 221, 222, 223, and 224 via corresponding switch elements 255, 253, 256, and 257, respectively. In other words, the IO channel 243 may simultaneously transmit the piece of data to each of the switch elements 255, 253, 256 and 257, allowing the switch elements 255, 253, 256, and 257 to route a corresponding copy of the piece of data to the memory-controllers 221, 222, 223, and 224, respectively. Each of the memory-controllers 221, 222, 223, and 224 may individually evaluate the copy of the piece of data it received, and determine whether the piece of data is directed to itself. If the piece of data is intended for, e.g., the memory-controller 223, then memory-controllers 221, 222, and 224 may discard the copies of the piece of data they received without any further action. The memory-controller 223 may then perform a data storing operation to save the piece of data to the storage units 213 it controls. Thus, a piece of data intended for a specific storage unit may be concurrently transmitted by any and all of the IO channels 241, 242, 243 and 244. The matrix of the switch elements in the channel-controller switch 230 may then route and deliver the piece of data to each of the memory-controllers 221, 222, 223, and 224 regardless of which IO channel the piece of data is received from.

In some embodiments, each memory-controller may be configured to parallel-transmit data to all of the IO channels via a corresponding set of switch elements. For example, the memory-controller 222 may be configured to concurrently transmit a piece of data to the IO channels 241, 242, 243, and 244 via switch elements 251, 252, 253, and 254, respectively. In other words, the memory-controller 222 may simultaneously transmit the piece of data to the switch elements 251, 252, 253, and 254, allowing the switch elements 251, 252, 253, and 254 to route a corresponding copy of the piece of data to the IO channels 241, 242, 243, and 244, respectively. Each of the IO channels 241, 242, 243, and 244 may individually evaluate the copy of the piece of data it received, and determine whether the piece of data is directed to itself. If the piece of data is intended for, e.g., the IO channel 242, then IO channels 241, 243, and 244 may discard the copies of the piece of data they received without any further action. The IO channel 242 may then transmit the piece of data to a client in communication with the IO channel 242. Details of the evaluating and discarding of the piece of data are further described below.

In some embodiments, multiple IO channels may be configured to parallel-transmit data to one of the memory-controllers via a corresponding set of switch elements. For example, the IO channel 242 may transmit a first piece of data to the memory-controller 222 via the switch element 252, and the IO channel 243 may concurrently transmit a second piece of data to the memory-controller 222 via the switch element 253. Thus, the memory-controller 222 may simultaneously receive two pieces of data from two IO channels 242 and 243. Likewise, multiple memory-controllers may be configured to parallel-transmit data to one of the IO channels via a corresponding set of switch elements. For example, the memory-controller 223 may transmit a first piece of data to the IO channel 243 via the switch element 256, and the memory-controller 224 may concurrently transmit a second piece of data to the IO channel 243 via the switch element 257. Thus, the IO channel 243 may simultaneously receive two pieces of data from two switch elements 256 and 257.

In some embodiments, multiple switch elements may perform concurrent data transmission at the same time. For example, a first switch element may facilitate the transfer of a first piece of data between a first IO channel and a first memory-controller, while a second switch element is facilitating the concurrently transfer of a second piece of data between a second IO channel and a second memory-controller. Further, the first switch element may be transferring data while a third switch element is facilitating the transfer of a third piece of data between a third memory-controller and a third IO channel. In order to take advantage of the parallel-transmission capability of the channel-controller switch 230, at least two IO channels and/or at least two memory-controllers may be utilized for the storing/retrieving of data to/from the storage units 211, 212, 213, and 214. Thus, the channel-controller switch 230 may provide flexibility in concurrently transmitting data among the IO channels and the memory-controllers.

Figure 3:
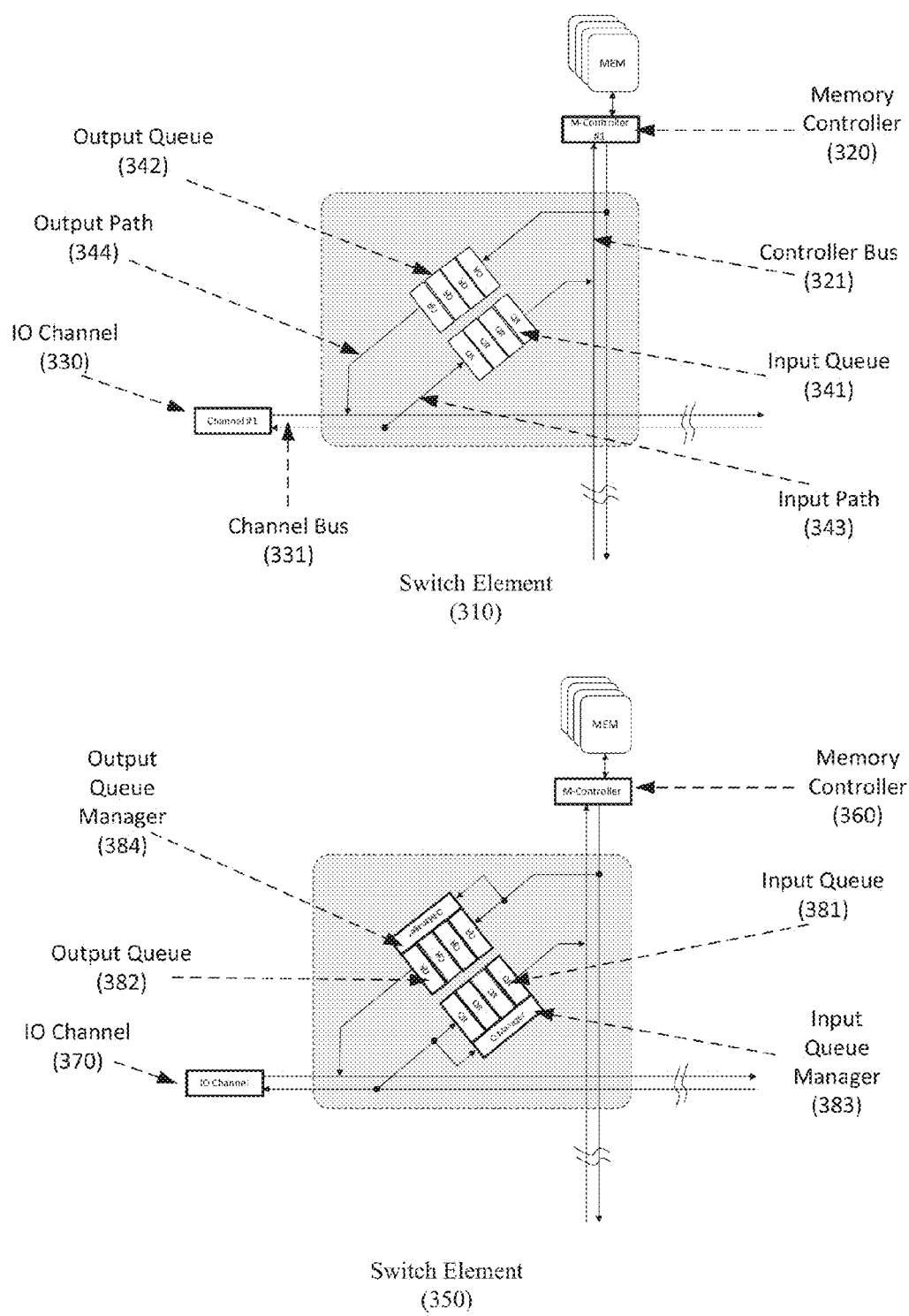
FIG. 3 shows various embodiments of a switch element in a channel-controller switch.

FIG. 3 shows various embodiments of a switch element in a channel-controller switch. The switch element 310 and the switch element 350 may be similar to any one of the matrix of switch elements in the channel-controller switch 230 of FIG. 2. In some embodiments, the switch element 310 is configured to connect an IO channel 330 with a memory-controller 320. Specifically, the IO channel 330 may be configured with a channel bus 331 for parallel-connecting with multiple switch elements. The switch element 310 may have an input path 343 and an output path 344 connected to the channel bus 331. The input path 343 may be dedicated for receiving data from the IO channel 330, and the output path 344 may be dedicated for transmitting data to the IO channel 330. The memory-controller 320 may be configured with a controller bus 321 for parallel-connecting with multiple switch elements. Thus, the input path 343 and the output path 344 of the switch element 310 may be connected with the controller bus 321 for transmitting data to, and receiving data from, the memory-controller 320, respectively.

In some embodiments, the switch element 310 may further be configured with an input queue 341 located on the input path 343, and an output queue 342 located on the output path 344. The input queue 341 may be a first-in-first-out queue. When multiple pieces of data are received from the IO channel 330 via the channel bus 331 and the input path 343, the switch element 310 may temporarily store the multiple pieces of data in the input queue 341 in the same order as they are received. The switch element 310 may then asynchronously deliver the data in the input queue 341 to the memory-controller 320 in a first-in-first-out order preserved in the input queue 341. Similarly, the output queue 342 may be a first-in-first-out queue utilized by the switch element 310 for asynchronously transmitting data from the memory controller 320 to the IO channel 330. Alternatively, the input queue 341 or the output queue 342 may be implemented using a memory buffer with a read/write control unit to handle the data being transmitted through the input path 343 or the output path 344.

In other embodiments, the switch element 350 may be configured to connect an IO channel 370 with a memory-controller 360. The switch element 350 may contain an input queue 381 and an output queue 382. Further, the switch element 350 may contain an input queue manager 383 for monitoring and managing the input queue 381, and an output queue manager 384 for monitoring and managing the output queue 382. In addition, the input queue manager 383 and the output queue manager 384 may be configured to perform local data movement. For example, a piece of data in the input queue 381 or the output queue 382 that is not intended for the memory-controller 360 or the IO channel 370 may be routed to another switch element of the matrix elements using data node rerouting services. For data request service interrupts, the queue manager 383 may interrupt a low priority data transmission between a memory-controller and an IO channel in order to serve a high priority request. Thus, the low priority data transmission may be stored in input queue or output queue, while the switch elements of the channel-controller switcher first serve the high priority request.

In some embodiments, the input queue manager 383 may process data temporarily stored in the input queue 381. For example, as the IO channel 370 may deliver data intended for another memory-controller (not the memory controller 360) to the switch element 350, the input queue manager 383 may parse the data stored in the input queue 381 for its destination information. Upon a determination that the destination of a piece of data is not the memory-controller 360, the input queue manager 383 may discard the piece of data without sending it to the memory-controller 360. Such an approach may greatly reduce the amount of data to be transmitted in the channel-controller switch, and save the memory-controller 360 for performing similar parsing operation. Likewise, the output queue manager 384 may process the data in the output queue 382, and discard any data from the output queue 382 that are not intended for the IO channel 370.

Figure 4:
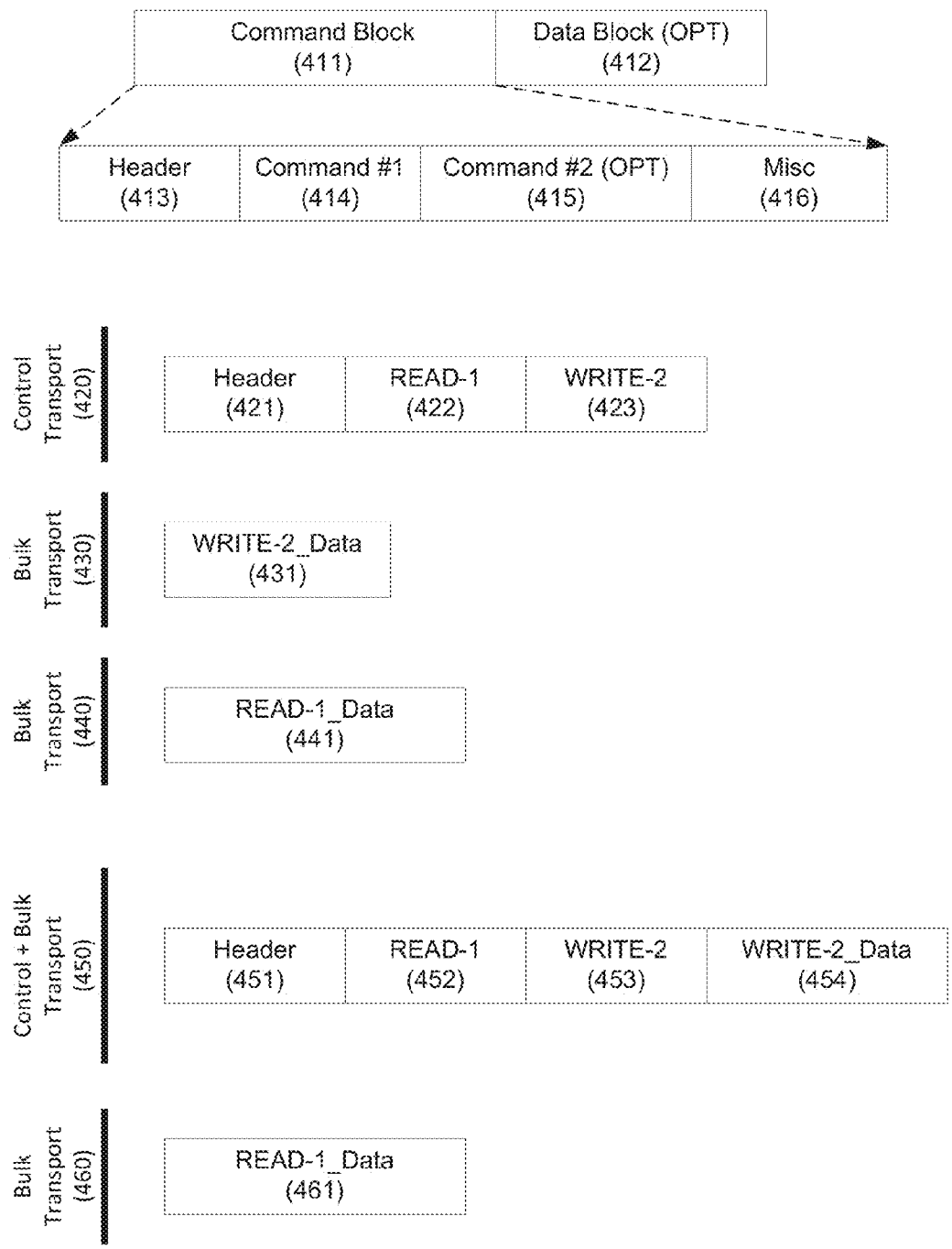
FIG. 4 illustrates embodiments of a multi-command protocol that is configured for a multi-channel storage system.

FIG. 4 illustrates embodiments of a multi-command protocol for a multi-channel storage system. In some embodiments, the multi-channel storage system may allow concurrent access via its multiple IO channels and provide concurrent data transmission via its multiple memory-controllers. To fully utilize these concurrent data transmission capabilities, the multi-channel storage system may concurrently process multiple read and/or write commands received from a client. Thus, by enabling multiple commands to be transmitted in a single request, the multi-command protocol may reduce the overhead when the multi-channel storage system is performing handshaking communications with the client.

In some embodiments, a request transmitted from a client to the multi-channel storage system may have a structure that is compatible with a multi-command protocol, and can carry more than one read or write command. The multi-command protocol may contain two main components: a command block 411 and an optional data block 412. The command block 411 may further contain a header 413, a first command 414, and optionally one or more additional commands such as a second command 415. Optional miscellaneous field 416 may also be a part of the command block 411.

In some embodiments, the header field 413 may be an optional field for storing the command configuration. When the command block 411 is a fixed structure, the header field 413 in the command block 411 may not be needed when the multi-channel storage system tries to decode the request. For example, a header field 413 in a first command block 411 may contain definitions such as "Command Number", "Command Size", "Data Block number", "Data Block Size", and/or the error correction information. The multi-channel storage system may interpret the command block 411 and record these definitions for subsequent command blocks 411. Afterward, as long as the subsequent command blocks 411 have a same fixed size as the first command block 411, these subsequent command blocks 411 may not need to carry their corresponding header fields 413.

Each command in the command block 411, such as the first command 414 or the second command 415, may be a read command, a write command, or any other supported commands. The number of commands in the command block 411 is not limited in the multi-command protocol. For example, for high-speed device interfaces that support above 100 GB/s bandwidths, hundreds of commands may be issued concurrently in a single command block 411. Compared to the receiving of multiple commands one-by-one from a client, receiving a request that contains the multiple commands may greatly reduce hand-shake communications conducted by the multi-channel storage system and the client.

In some embodiments, a read command in a request issued by a client may contain a first set of identifiers that are associated with a sub-group of IO channels, and a second set of identifiers that are associated with a subset of memory-controllers. Specifically, the subset of memory-controllers may have access to the storage units that store data requested by the read-command, and the sub-group of IO channels may be dedicated to concurrently transmit the requested data to the client. When the requested data is stored as multiple segments in one or more storage units, the client may first identify the subset of memory-controllers that can retrieve all segments, and then assign the segments to the sub-group of IO channels for delivery. The multi-channel storage system may then follow instructions in the read command to retrieve the multiple segments via the subset of memory-controllers. Once the segments are ready for delivery, the multi-channel interface of the multi-channel storage system may transport each of the segments via its assigned IO channel to the client. Upon receiving all the segments from the sub-group of IO channels, the client may reassemble the requested data from all the segments.

In some embodiments, a write command in a request issued by a client may also contain a first set of identifiers that are associated with a sub-group of IO channels, and a second set of identifiers that are associated with a subset of memory-controllers. Specifically, the sub-group of IO channels may be dedicated to concurrently receive data-to-be-stored to the storage units, and the subset of memory-controllers may be assigned to concurrently save the data-to-be-stored to the storage units. The client may first divide the data-to-be-stored to multiple segments, and assign each of the segments to one or more of the sub-groups of IO channels and one or more of the subsets of memory-controllers. The multi-channel storage system may then follow the instructions in the write command by utilizing the sub-group(s) of IO channels for receiving the multiple segments, and storing the multiple segments via the subset(s) of memory-controllers, according to the IO channel and memory-controller assigned to each segment.

In some embodiments, the data block 412 may be an optional block for storing additional data related to the command block 411. For example, when the command block 411 of a request contains a write command, the data-to-be-stored that is associated with the write command may be carried in the data block 412 of the request. In this case, it is not necessary to send the data-to-be-stored in a second request subsequent to the first request.

In some embodiments, a request may be categorized as a control transport, a bulk transport, or both. A request may be deemed having a control transport when the request includes specifications such as the identifiers for IO channels and memory-controllers, as well as vendor-specific instructions related to flash-based storage units. The request may be deemed a bulk transport when it is mainly for transmitting/receiving data to/from the multi-channel storage system. For example, when a request includes a read command, the multi-channel storage system may first retrieve the requested data from the storage units. Afterward, an interrupt transport may be transmitted by the multi-channel storage system to notify the client that the requested data is ready for access. The client may then issue a subsequent request which is deemed a bulk transport for retrieving the requested data. Likewise, a request including a write command may be deemed a control transport, and a subsequent request containing data-to-be-stored may be deemed a bulk transport. Compared to a control transport, a bulk transport may reduce the processing time and wait time for the multi-channel storage system.

In FIG. 4, a request 420 may be deemed a control transport since it includes a header section 421, a first command 422 for read ("read-1"), and a second command for write ("write-2"). Upon receiving the request 420, the multi-channel storage system may prepare itself for receiving a second request containing data-to-be-stored related to the "write-2" command. The client may then issue the second request 430 for bulk transport of data related to the "write-2" command. Thus, the second request may have a data block 431 containing the data-to-be-stored ("WRITE-2_data"), and may be concurrently sent to multiple IO channels of the multi-channel storage system. With respect to the "read-1" command in request 420, the multi-channel storage system may issue an interrupt transport to the client once the requested data is retrieved and ready for transmission. Upon receiving the interrupt transport, the client may issue a subsequent request (a third request) 440 for bulk transporting of the requested data ("READ-1_Data") 441 related to the "read-1" command. In some embodiments, the multi-channel storage system may concurrently process the above read command 422 and the write command 423.

In some embodiments, the client may issue a request 450 which contains both a control transport and a bulk transport. The control transport may be a command block 411 which defines a first read command 452 and a second write command 453. The bulk transport may be in a data block 412 which contains data-to-be-stored 454 ("WRITE-2-Data") related to the write command 453. In this scenario, the multi-channel storage system may no longer need to wait for another bulk transport for the data 454, thereby reducing time spent on waiting for a subsequent request. With respect to the read command 452, a subsequent request 460 containing a bulk transport for the requested data 461 ("READ-1_Data") may be issued by the client after it receives an interrupt message from the multi-channel storage system indicating the requested data 461 is ready.

Figure 5:
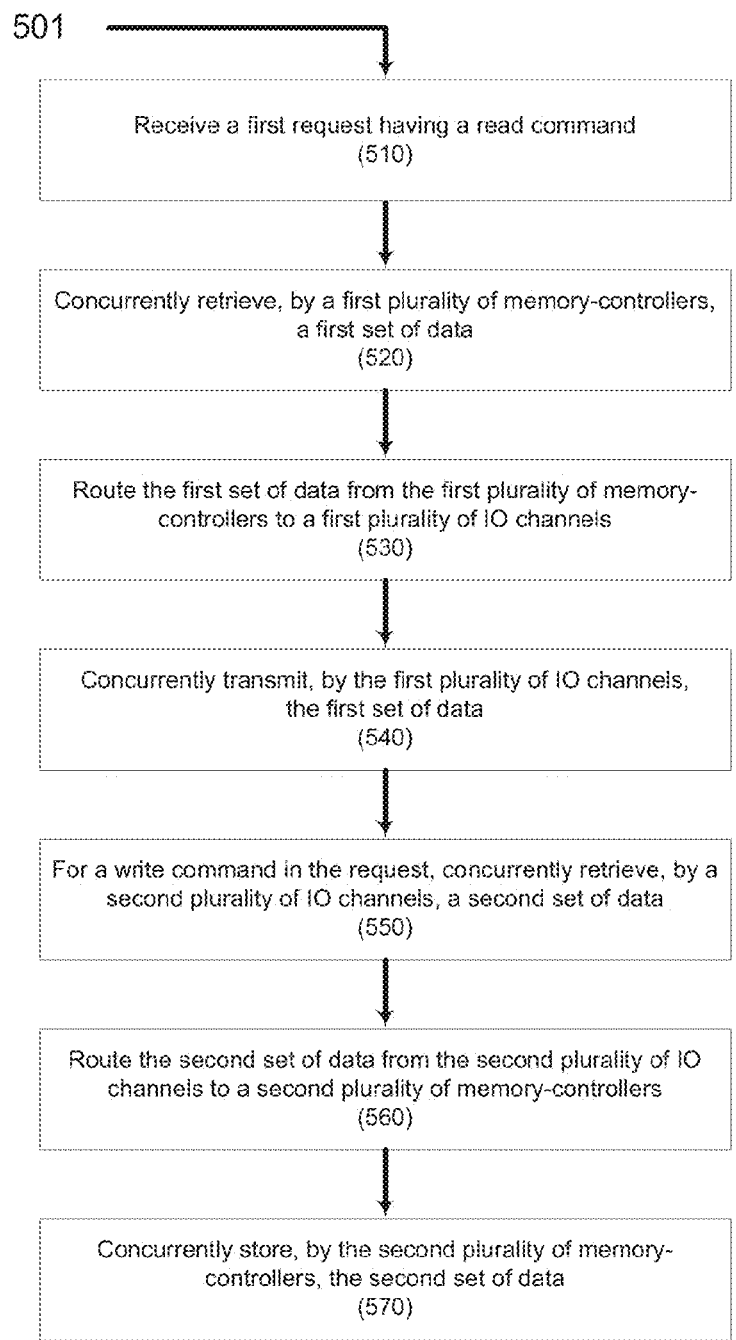
FIG. 5 shows a flow diagram of an illustrative embodiment of a process for processing requests received by a multi-channel storage system.

FIG. 5 shows a flow diagram of an illustrative embodiment of a process 501 for processing requests received by a multi-channel storage system. The process 501 may include one or more operations, functions, or actions as illustrated by blocks 510, 520, 530, 540, 550, 560, and 570, which may be performed by hardware, software and/or firmware. The various blocks are not intended to be limiting to the described embodiments. For example, one skilled in the art will appreciate that, for this and other processes and methods disclosed herein, the functions performed in the processes and methods may be implemented in differing order.

Furthermore, the outlined steps and operations are only provided as examples, and some of the steps and operations may be optional, combined into fewer steps and operations, or expanded into additional steps and operations without detracting from the essence of the disclosed embodiments. Although the blocks are illustrated in a sequential order, these blocks may also be performed in parallel, and/or in a different order than those described herein. In some embodiments, machine-executable instructions for the process 501 may be stored in memory, executed by a processor, and/or implemented in a multi-channel storage system.

At block 510, a multi-channel storage system may receive, from a client, a first request. The first request may include a read command seeking to retrieve a first set of data. The read command may contain a first set of identifiers that are associated with a first plurality of input-output (IO) channels of the multi-channel-storage system, and a second set of identifiers that are associated with a first plurality of memory-controllers of the multi-channel storage system.

At block 520, the first plurality of memory-controllers may concurrently retrieve the first set of data requested by the read command from one or more storage units controlled by the first plurality of memory-controllers.

At block 530, a channel-controller switch may route the first set of data from the first plurality of memory-controllers to the first plurality of IO channels. Specifically, the channel-controller switch may contain a matrix of switch elements. For a switch element selected from the matrix of switch elements and coupled with one of the first plurality of memory-controllers and one of the first plurality of IO channels, the switch element may transmit data received from the one of the first plurality of memory-controllers to the one of the first plurality of IO channels.

At block 540, the first plurality of IO channels may concurrently transmit the first set of data to the client. In some embodiment, the multi-channel storage system may first transmit an interrupt message to the client indicating the first set of data is ready for transmission. Upon receiving a second request in response to the interrupt message, the multi-channel interface may start the transmitting of the first set of data via the first plurality of IO channels.

At block 550, the first request may further contain a write command. The write command may contain a third set of identifiers and a fourth set of identifiers. The third set of identifiers are associated with a second plurality of input-output (IO) channels of the multi-channel storage system, and the fourth set of identifiers are associated with a second plurality of memory-controllers of the multi-channel storage system. In some embodiments, the first request may further contain a second set of data for the write command. Alternatively, a second request subsequent to the first request may contain the second set of data, which is associated with the write command in the first request. The second plurality of IO channels may concurrently receive the second set of data from the client.

At block 560, the channel-controller switch may route the second set of data to the second plurality of memory-controllers. At block 570, the second plurality of memory-controllers may concurrently store the second set of data to the one or more storage units controlled by the second plurality of memory-controllers.

Figure 6:
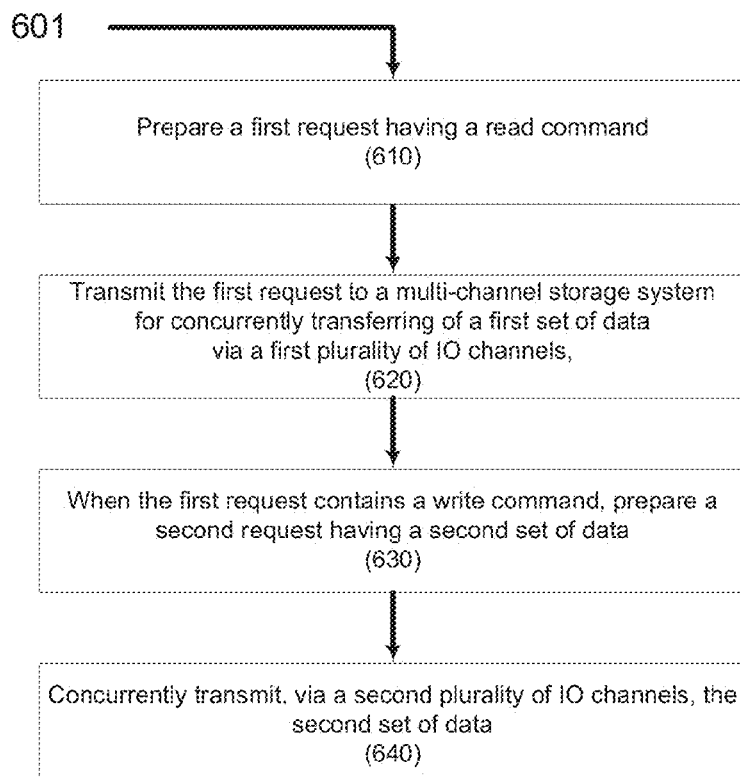
FIG. 6 shows a flow diagram of an illustrative embodiment of a process for transmitting requests to a multi-channel storage system.

FIG. 6 shows a flow diagram of an illustrative embodiment of a process 601 for transmitting requests to a multi-channel storage system. The process 601 may include one or more operations, functions, or actions as illustrated by blocks 610, 620, 630, and 640, which may be performed by hardware, software and/or firmware. The various blocks are not intended to be limiting to the described embodiments. For example, one skilled in the art will appreciate that, for this and other processes and methods disclosed herein, the functions performed in the processes and methods may be implemented in differing order.

At block 610, a client computer system may prepare a first request containing a read command. The read command may include a first set of identifiers each of which referring to one of a first plurality of input-output (IO) channels in the multi-channel storage system, and a second set of identifiers each referring to one of a first plurality of memory-controllers in the multi-channel storage system. The read command may seek a first set of data stored in storage units of the multi-channel storage system.

At block 620, the client computer system may transmit the first request to the multi-channel storage system via the first plurality of IO channels. The first request may contain instructions requesting the multi-channel storage system to concurrently transfer the first set of data via the first plurality of IO channels. Upon receiving the first request, the multi-channel storage system is configured to extract the read command from the first request, instruct the first plurality of memory-controllers via the channel controller switch to parallel-retrieve the first set of data from one or more storage units, and instruct the first plurality of IO channels to concurrently transfer the first set of data to the computer system.

In some embodiments, the first request may contain a write command and a second set of data associated with the write command. The write command includes a third set of identifiers each of which referring to one of a second plurality of IO channels in the multi-channel storage system, and a fourth set of identifiers each of which referring to one of a second plurality of memory-controllers in the multi-channel storage system. In this case, the multi-channel storage system is configured to extract the write command from the first request, instruct the second plurality of IO channels to concurrently receive the second set of data from the computer system, and instruct the second plurality of memory-controllers to concurrently store the second set of data to the one or more storage units.

In some embodiments, the first request does not contain the second set of data. In this case, at block 630, the client computer system may prepare a second request containing the second set of data. At block 640, the client computer system may transmit the second request to the multi-channel storage system via the second plurality of IO channels. Specifically, upon receiving the second request, the multi-channel storage system is configured to instruct the second plurality of IO channels to concurrently receive the second set of data from the computer system, and instruct the second plurality of memory-controllers to concurrently store the second set of data to the one or more storage units.

FIG. 7 is a block diagram of an illustrative embodiment of a computer program product 700 for implementing a method for providing data services by a multi-channel storage system. Computer program product 700 may include a signal bearing medium 702. Signal bearing medium 702 may include one or more sets of executable instructions 704 that, when executed by, for example, a processor, may provide the functionality described above. Thus, for example, referring to FIG. 1, the multi-channel storage system or the clients may undertake one or more of the operations shown in at least FIG. 5 in response to the instructions 704.

In some implementations, signal bearing medium 702 may encompass a non-transitory computer readable medium 706, such as, but not limited to, a hard disk drive (HDD), a Compact Disc (CD), a Digital Versatile Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communication link, a wireless communication link, etc.). Thus, for example, referring to FIG. 1, computer program product 700 may be wirelessly conveyed to the multi-channel storage system 130 by signal bearing medium 702, where signal bearing medium 702 is conveyed by communications medium 710 (e.g., a wireless communication medium conforming with the IEEE 802.11 standard). Computer program product 700 may be recorded on non-transitory computer readable medium 706 or another similar recordable medium 708.

Figure 8:
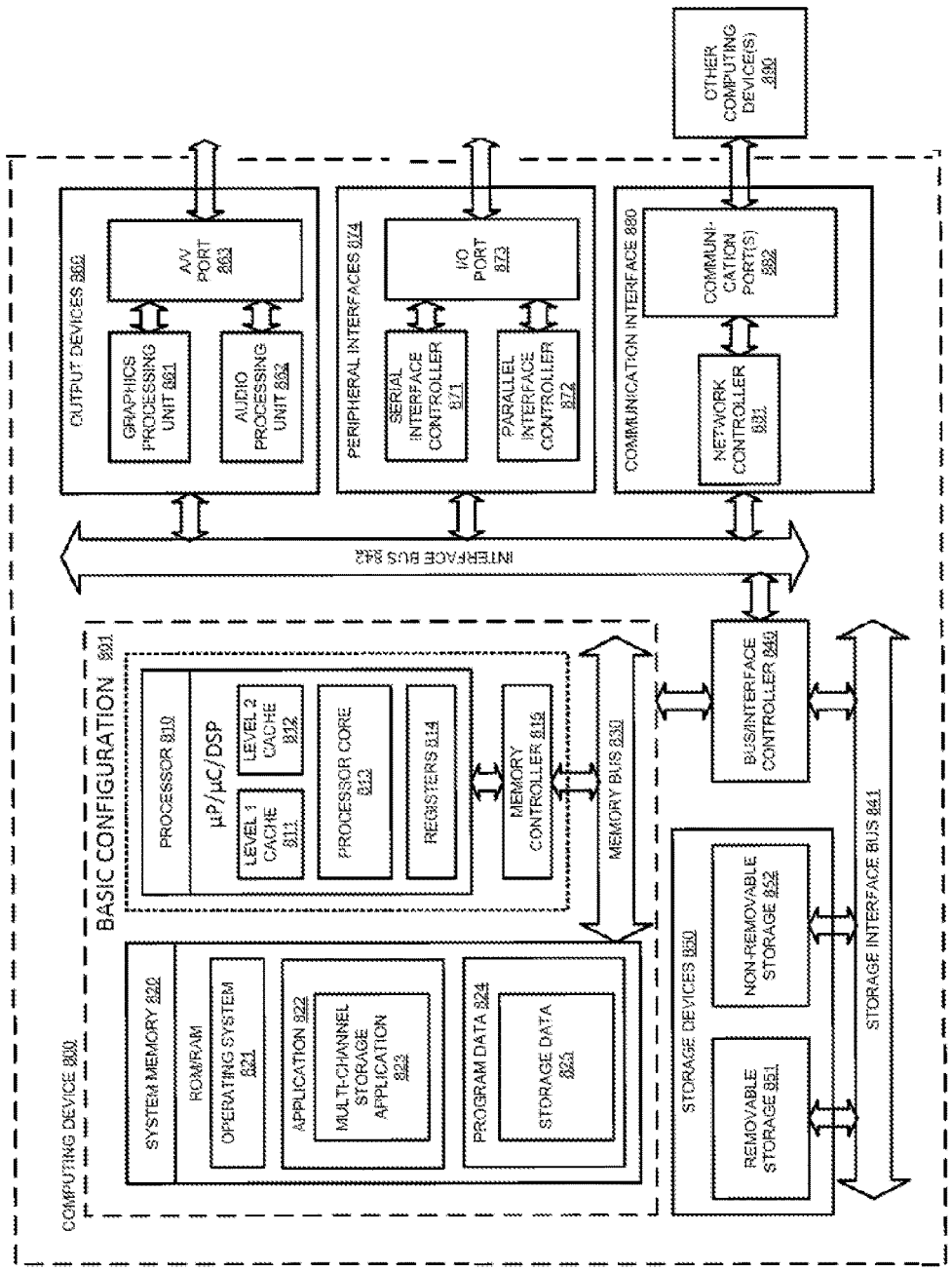
FIG. 8 shows a block diagram of an illustrative embodiment of an example computer system, all arranged in accordance with at least some embodiments of the present disclosure.

FIG. 8 shows a block diagram of an illustrative embodiment of an example computing device 800. In a very basic configuration 801, the computing device 800 may include one or more processors 810 and a system memory 820. A memory bus 830 may be used for communicating between the processor 810 and the system memory 820.

Depending on the desired configuration, processor 810 may be of any type including but not limited to a microprocessor (μP), a microcontroller (μC), a digital signal processor (DSP), or any combination thereof. Processor 810 can include one or more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations, the memory controller 815 can be an internal part of the processor 810.

Depending on the desired configuration, the system memory 820 may be of any type including but not limited to volatile memory (such as RAM), non-volatile memory (such as ROM, flash memory, etc.) or any combination thereof. The system memory 820 may include an operating system 821, one or more applications 822, and program data 824. The application 822 may include a multi-channel storage application 823 that is arranged to perform the functions and/or operations as described herein including at least the functional blocks and/or operations described with respect to the process 501 of FIG. 5. The program data 824 may include storage data 825 to be accessed by the multi-channel storage application 823. In some example embodiments, the application 822 may be arranged to operate with the program data 824 on the operating system 821 such that implementations of the channel-controller-switching may be provided as described herein. This described basic configuration is illustrated in FIG. 8 by those components within dashed line 801.

Storage device 850, which includes removable storage 851 and non-removable storage 852, and the basic configuration 801 may together be configured to perform the functions and/or operations as described herein. For example, the non-removable storage 852 may correspond to flash pages, which may be accessed for data read and/or write operations. The basic configuration 801 may act as a storage controller that issues commands to access multi-channels in the storage device 850, so that there is high speed access to data stored on removable storage 851 and/or non-removable storage 852.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, etc., and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to", etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A multi-channel storage system, comprising:
a plurality of memory-controllers, each memory-controller configured to control one or more storage units;
a multi-channel interface that includes a plurality of input-output (IO) channels; and
a channel-controller switch configured to support communication of data between any one of the plurality of IO channels and any one of the plurality of memory-controllers,
wherein in response to receipt of a request that instructs use of at least two of the plurality of IO channels and at least two of the plurality of memory-controllers, the multi-channel interface is configured to utilize the channel-controller switch to concurrently transfer the data via the at least two of the plurality of IO channels or the at least two of the plurality of memory-controllers,
wherein the channel-controller switch comprises a matrix of switch elements, at least one switch element in the matrix is configured to facilitate transfer of the data between one IO channel of the plurality of IO channels and one memory-controller of the plurality of memory-controllers,
wherein the at least one switch element comprises:
an input queue manager configured to discard input data that is not intended for the one memory-controller or to route the input data that is not intended for the one memory-controller to another switch element selected from the matrix of switch elements, and
an output queue manager configured to discard output data that is not intended for the one IO channel or to route the output data that is not intended for the one IO channel to another switch element selected from the matrix of switch elements, and
wherein concurrent transfer of the data includes:
transmission of a message that indicates that a first set of data is ready for transfer; and
concurrent transmission of the first set of data via the at least two of the plurality of IO channels or the at least two of the plurality of memory-controllers.

2. A method to access a multi-channel storage system, the method comprising:
receiving, by the multi-channel storage system, a first request that includes a read command that seeks a first set of data, wherein the read command includes a first set of identifiers and a second set of identifiers, the first set of identifiers being associated with a first plurality of input-output (IO) channels of the multi-channel storage system, and the second set of identifiers being associated with a first plurality of memory-controllers of the multi-channel storage system;
concurrently retrieving, by the first plurality of memory-controllers, the first set of data from one or more storage units coupled with the first plurality of memory-controllers;
routing, by a channel-controller switch of the multi-channel storage system and that comprises a matrix of switch elements, the first set of data from the first plurality of memory-controllers to the first plurality of IO channels;
concurrently transmitting, by the first plurality of IO channels, the first set of data,
wherein concurrently retrieving the first set of data comprises discarding input data that is not intended for a memory-controller of the first plurality of memory-controllers or routing the input data that is not intended for the memory-controller to a switch element selected from the matrix of switch elements,
wherein routing the first set of data comprises discarding output data that is not intended for an IO channel of the first plurality of IO channels or routing the output data that is not intended for the IO channel to another switch element selected from the matrix of switch elements, and
wherein concurrently transmitting the first set of data comprises:

transmitting, by the multi-channel storage system, a message that indicates that the first set of data is ready for transmission; and after receiving a second request in response to the message, concurrently transmitting the first set of data via the first plurality of 10 channels.

3. The method as recited in claim 2, wherein:

receiving the first request comprises receiving the first request with a write command further included therein to write a second set of data, the write command includes a third set of identifiers and a fourth set of identifiers, the third set of identifiers being associated with a second plurality of IO channels of the multi-channel storage system, the fourth set of identifiers being associated with a second plurality of memory-controllers of the multi-channel storage system, and the method further comprises:
concurrently receiving, by the second plurality of IO channels, the second set of data;
routing, by the channel-controller switch, the second set of data to the second plurality of memory-controllers; and
concurrently storing, by the second plurality of memory-controllers, the second set of data to the one or more storage units.

4. The method as recited in claim 2, wherein:

receiving the first request comprises receiving the first request with a write command further included therein, the write command includes a third set of identifiers and a fourth set of identifiers, the third set of identifiers being associated with a second plurality of IO channels of the multi-channel storage system, the fourth set of identifiers being associated with a second plurality of memory-controllers of the multi-channel storage system, and the method further comprises:
concurrently receiving, by the second plurality of IO channels, a second request that includes a second set of data;
routing, by the channel-controller switch, the second set of data to the second plurality of memory-controllers; and
concurrently storing, by the second plurality of memory-controllers, the second set of data to the one or more storage units.

5. The method as recited in claim 4, wherein receiving the second request includes receiving the second request subsequent to receiving the first request, and the second set of data in the second request is associated with the write command in the first request.

6. A method to access a multi-channel storage system comprising a channel controller switch that includes a matrix of switch elements, the method comprising:

preparing, by a computer system, a first request that includes a read command that seeks a first set of data, wherein the read command includes a first set of identifiers, wherein each identifier of the first set of identifiers refers to one of a first plurality of input-output (IO) channels in the multi-channel storage system, wherein the read command further includes a second set of identifiers, and wherein each identifier of the second set of identifiers refers to one of a first plurality of memory-controllers in the multi-channel storage system; and transmitting, by the computer system, the first request to the multi-channel storage system, wherein the multi-channel storage system is configured to:
extract the read command from the first request,
instruct the first plurality of memory-controllers to concurrently retrieve the first set of data from one or more storage units,
discard input data that is not intended for a memory-controller of the first plurality of memory-controllers or route the input data that is not intended for the memory-controller to a switch element selected from the matrix of switch elements,
discard output data that is not intended for an IO channel of the first plurality of IO channels or route the output data that is not intended for the IO channel to another switch element selected from the matrix of switch elements, and
instruct the first plurality of IO channels to concurrently transfer the first set of data to the computer system,
wherein concurrent transfer of the first set of data comprises:
transmission, by the multi-channel storage system, a message that indicates that the first set of data is ready for transmission; and
after receipt of a second request in response to the message, concurrent transmission of the first set of data via the first plurality of IO channels.

7. The method as recited in claim 6, wherein:

the first request further includes a write command to write a second set of data, the write command includes a third set of identifiers each of which refers to one of a second plurality of IO channels in the multi-channel storage system, and a fourth set of identifiers each of which refers to one of a second plurality of memory-controllers in the multi-channel storage system, and the multi-channel storage system is further configured to:
extract the write command from the first request,
instruct the second plurality of IO channels to concurrently receive the second set of data from the computer system, and
instruct the second plurality of memory-controllers to concurrently store the second set of data to the one or more storage units.

8. The method as recited in claim 6, wherein:

the first request further includes a write command, the write command includes a third set of identifiers each of which refers to one of a second plurality of IO channels in the multi-channel storage system, and a fourth set of identifiers each of which refers to one of a second plurality of memory-controllers in the multi-channel storage system, and the method further comprises:
preparing, by the computer system, a second request that includes a second set of data; and
transmitting, by the computer system, the second request to the multi-channel storage system, wherein the multi-channel storage system is further configured to:
instruct the second plurality of IO channels to concurrently receive the second set of data from the computer system, and
instruct the second plurality of memory-controllers to concurrently store the second set of data to the one or more storage units.

9. A multi-channel storage system, comprising:
a plurality of memory-controllers, each memory-controller configured to control one or more storage units;
a multi-channel interface that includes a plurality of input-output (IO) channels; and
a channel-controller switch configured to support communication of data between any one of the plurality of IO channels and any one of the plurality of memory-controllers,
wherein in response to receipt of a request that instructs use of at least two of the plurality of IO channels and at least two of the plurality of memory-controllers, the multi-channel interface is configured to utilize the channel-controller switch to concurrently transfer the data via the at least two of the plurality of IO channels or the at least two of the plurality of memory-controllers,
wherein the channel-controller switch comprises a matrix of switch elements, each of which is configured to facilitate transfer of the data between one IO channel of the plurality of IO channels and one memory-controller of the plurality of memory-controllers,
wherein each of the switch elements comprises:
an input queue manager configured to discard input data that is not intended for the one memory-controller or to route the input data that is not intended for the one memory-controller to another switch element selected from the matrix of switch elements, and
an output queue manager configured to discard output data that is not intended for the one IO channel or to route the output data that is not intended for the one IO channel to another switch element selected from the matrix of switch elements, and
wherein concurrent transfer of the data includes:
transmission of a message that indicates that a first set of data is ready for transfer; and
after receipt of another request in response to the message, concurrent transmission of the first set of data via the at least two of the plurality of IO channels or the at least two of the plurality of memory-controllers.

10. The multi-channel storage system as recited in claim 9, further comprising:
a computer system coupled with the multi-channel interface and configured to issue the request, wherein the request includes one or more commands to store the data to, or retrieve the data from, the multi-channel storage system.

11. The multi-channel storage system as recited in claim 9, further comprising:
a network switch coupled with the multi-channel interface and configured to forward the request, which is received from a network computer system, wherein the request includes one or more commands to store the data to, or retrieve the data from, the multi-channel storage system.

12. The multi-channel storage system as recited in claim 9, wherein each of the switch elements further comprises:
an input queue configured to facilitate transfer of input data received from the one IO channel; and
an output queue configured to facilitate transfer of output data received from the one memory-controller.

13. The multi-channel storage system as recited in claim 12, wherein the input queue and the output queue are configured as first-in-first-out queues.

14. The multi-channel storage system as recited in claim 12, wherein:
the input queue manager is coupled with the input queue, wherein the input queue manager is configured to process the input data in the input queue; and
the output queue manager is coupled with the output queue, wherein the output queue manager is configured to process the output data in the output queue.

15. The multi-channel storage system as recited in claim 9, wherein for a particular IO channel selected from the plurality of IO channels, the particular IO channel is configured to concurrently transfer a piece of data received by the particular IO channel to each of the plurality of memory-controllers via a set of switch elements that are selected from the matrix of switch elements and coupled with the particular IO channel and the plurality of memory-controllers.

16. The multi-channel storage system as recited in claim 9, wherein for a particular memory-controller selected from the plurality of memory-controllers, the particular memory-controller is configured to concurrently transfer a piece of data retrieved by the particular memory-controller to each of the plurality of IO channels via a set of switch elements that are selected from the matrix of switch elements and coupled with the particular memory-controller and the plurality of IO channels.

* * * * *

UNITED STATES PATENT AND TRADEMARK OFFICE
CERTIFICATE OF CORRECTION

Page 1 of 1

PATENT NO. : 9,594,714 B2
APPLICATION NO. : 14/001174
DATED : March 14, 2017
INVENTOR(S) : Chang It is certified that error appears in the above-identified patent and that said Letters Patent is hereby corrected as shown below:

In the Specification

In Column 1, Line 9, delete "§371" and insert -- § 371 --, therefor.

In the Claims

In Column 17, Line 6, in Claim 2, delete "10" and insert -- IO --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*